3,145,083
PRODUCTION OF SILICON TETRACHLORIDE

Louis S. Belknap, Malden, and Clifford Le Roy Carpenter, Wellesley Hills, Mass., assignors to Cabot Corporation, Boston, Mass., a corporation of Delaware
No Drawing. Filed June 22, 1959, Ser. No. 821,703
5 Claims. (Cl. 23—205)

This invention relates to silicon tetrachloride and in particular to a process for the production of silicon tetrachloride from sand in high yields.

It is a principal object of the present invention to provide an improved process for the production of silicon tetrachloride.

It is another object of the present invention to provide a process whereby silicon tetrachloride can be produced in good yields from sand.

Other objects will in part be obvious and will in part appear hereinafter.

In accordance with the present invention it was discovered that silicon tetrachloride can be produced in good yields by reacting silica sand with carbon monoxide and chlorine at temperatures above about 2200° F. The advantages of the process of the present invention are many: In particular, unlike prior art processes, the present process utilizes relatively inexpensive raw materials, usually requires no external source of heat after initiation of the reaction, requires no pelletizing or briqueting operation, and is readily adaptable to presently existing fixed-bed chlorination apparatus in which a single (premixed) solids component is reacted with gaseous reactants.

The reaction of carbon monoxide, chlorine and silica sand is substantially exothermic and accordingly, once initiated, is self-sustaining.

However, if circumstances call for temperatures higher than those self-attainable in the apparatus used, such higher temperatures are readily attained by preheating one or more of the reactants prior to their introduction into the reaction zone. For example, either the sand or the gaseous reactants or both can be preheated but preferably the carbon monoxide and/or chlorine will be supplied in preheated from. Alternatively, the same result can be achieved by introducing into the reaction zone, small amounts of oxygen (or air) which on reaction therein with some of the carbon monoxide liberates additional heat. When oxygen is introduced into the reaction zone, an amount of carbon monoxide at least slightly in excess of the amount stoichiometrically necessary for both the main reaction ($SiO_2 + 2Cl_2 + 2CO \rightarrow SiCl_4 + 2CO_2$) and for the reaction between carbon monoxide and oxygen ($2CO + O_2 \rightarrow 2CO_2$) is introduced in order to minimize the amount of unreacted oxygen which will be present in the product stream since free oxygen therein would react with the silicon tetrachloride product to form silicon oxychlorides which contaminate the product.

The quantity of the gaseous reactants, carbon monoxide and chlorine, utilized in the present invention is not critical. Preferably, however, the carbon monoxide and chlorine are introduced into the reaction zone in about a 1:1 molar ratio, since an excess of either one over the other is largely wasted. Accordingly, large excesses of one over the other become increasingly economically disadvantageous.

Any silica sand which comprises at least about 95% $SiO_2$ is suitable for the purposes of the present invention. Sands comprising less than about 95% $SiO_2$ often contain substantial quantities of calcium, magnesium, and other compounds which cause fluxing and fusing of the sand particles and concomitant serious curtailment of the reaction. Of course, if the sand is of even greater purity than 95%, for example if the sand contains little or no iron, subsequent operations such as separating ferric chloride from the silicon tetrachloride product are minimized or totally eliminated. Accordingly, sands high in silicon dioxide content (above about 99% $SiO_2$) and low in impurity content are preferred.

The particle size of the silica sand is not critical. In general, the use of smaller particle size sands increases the reaction rate, but also increases the possibility of channeling in, and clogging of, fixed-bed reactors. It has been found by experience, however, that particle sizes between about 20 mesh and 200 mesh are entirely suitable for the purposes of the present invention.

No particular pre-treatment of the sand prior to its use is necessary. However, the sand is preferably washed and thoroughly dried prior to use. The washing is desirable in order to remove loose impurities (including organic matter), and drying thereafter is important because the presence of appreciable quantities of moisture in the product stream causes hydrolysis of the silicon tetrachloride product.

In one embodiment of the invention, phosgene is utilized in place of a mixture of carbon monoxide and chlorine. The use of phosgene is advantageous in that the desired reactants (carbon monoxide and chlorine) are present in phosgene as an intimate mixture and in the preferred equimolar ratio. On the other hand, the use of phosgene is disadvantageous in that the reaction between phosgene and sand is less exothermic than the corresponding reaction involving sand, carbon monoxide and chlorine, and in the fact that phosgene, having a relatively low thermal capacity, cannot usually be sufficiently preheated to render the reaction thermally self-sustaining. Accordingly, when phosgene is utilized in place of a mixture of chlorine and carbon monoxide, an additional source of heat is generally required, such as preheating of the sand, external heating of the reaction bed, or the introduction of auxiliary reactants, e.g., $CO + O_2$ which react strongly exothermically.

There follow a number of non-limiting illustrative examples:

Example 1

70 grams of "Wedron" silica sand, produced by Wedron Silica Co., Chicago, Illinois, were placed in a vertical 1" I.D. fused quartz tube. The sand was a screened −20 mesh to +40 mesh (U.S. Standard) fraction and was nominally analyzed as 99.9% $SiO_2$. The quartz tube and contents were heated to about 2500° F. by a "Sentry" electric resistance tube furnace surrounding the entire reactor. Gaseous chlorine and carbon monoxide were fed to the bottom of the quartz tube at a rate of 0.14 s.c.f.h. and 0.15 s.c.f.h respectively. The reaction occurred smoothly to give a 75% yield of silicon tetrachloride vapor (10.8 grams per hour), carbon dioxide (5.6 grams per hour, unreacted chlorine (3 grams per hour), and unreacted carbon monoxide (1.2 grams per hour).

Example 2

This example is a duplicate of Example 1 except that the quartz tube was heated to only about 2200° F. After two hours, there was no evidence of the production of silicon tetrachloride.

Example 3

70 grams of "Wedron" silica sand, produced by Wedron Silica Co., Chicago, Illinois, is placed in a vertical 1" I.D. fused gravity tube. The sand is a screened −80 mesh to +100 mesh fraction. The quartz tube and contents are heated externally to about 2600° F. by a "Sentry" resistance tube furnace. Phosgene is fed to the bottom of the tube at a rate of about 0.12 s.c.f.h. The reaction occurs smoothly to give an 85% yield of silicon tetrachloride vapor.

Obviously many changes may be made in the above described procedure and examples without departing from the scope of the invention. For example, although only an electric resistance furnace was specifically mentioned, clearly many other external sources of heat are equally suitable for initiating the reaction of the present invention. Also, although only a fixed bed type of apparatus was disclosed as suitable for containing the reaction, many other types of apparatus, such as a fluid bed system are also suitable.

Accordingly, it is tended that the above disclosure be regarded as illustrative and as in no way limiting the scope of the invention.

What we claim is:

1. A process for producing silicon tetrachloride at high yields which consist essentially of treating a solid charge consisting essentially of hi-grade silica sand containing at least 95% by weight of silica with a reactant chosen from the group consisting of a gaseous mixture of carbon monoxide and chlorine, and phosgene, at temperatures substantially above about 2200° F.

2. The process of claim 1 wherein said temperatures are between 2300° F. and 2800° F.

3. The process of claim 1 wherein said reactant comprises a mixture of carbon monoxide and chlorine.

4. The process of claim 3 wherein oxygen is introduced into the reaction zone.

5. The process of claim 4 wherein said gaseous carbon monoxide is present in amounts at least slightly in excess of the amounts necessary (a) to establish a 1:1 molar ration of chlorine to carbon monoxide and (b) to stoichiometrically react with all said oxygen introduced into the reaction zone.

References Cited in the file of this patent

UNITED STATES PATENTS

| | | |
|---|---|---|
| 2,311,466 | Pechukas | Feb. 16, 1943 |
| 2,401,544 | Brallier | June 4, 1946 |
| 2,594,370 | Warburton | Apr. 29, 1952 |
| 2,657,118 | Phillips et al. | Oct. 27, 1953 |
| 2,843,458 | Beattie et al. | July 15, 1958 |
| 2,946,668 | Richelsen | July 26, 1960 |
| 2,952,513 | Wigton | Sept. 13, 1960 |

OTHER REFERENCES

Mellor: "Comprehensive Treatise on Inorganic and Theoretical Chemistry," 1924, vol. 5, page 963.